(12) United States Patent
Kiryczun

(10) Patent No.: US 6,276,388 B1
(45) Date of Patent: Aug. 21, 2001

(54) MOVEMENT DETECTOR AND FLUID SHUT-OFF DEVICE

(76) Inventor: Ricardo Roberto Kiryczun, 76 Buchanan Ct., Palo Alto, CA (US) 94303

(*) Notice: Subject to any disclaimer, the term of this patent is extended or adjusted under 35 U.S.C. 154(b) by 0 days.

(21) Appl. No.: 09/531,544

(22) Filed: Mar. 20, 2000

(51) Int. Cl.[7] .................................................. G05D 27/00
(52) U.S. Cl. .......................... 137/45; 251/72; 251/74; 137/38
(58) Field of Search .................... 251/72, 74; 137/38, 137/45

(56) References Cited

U.S. PATENT DOCUMENTS

| | | | |
|---|---|---|---|
| 2,054,563 | * 9/1936 | Hansen | 137/139 |
| 3,791,396 | * 2/1974 | Nelson | 137/38 |
| 3,888,271 | * 6/1975 | Pettit | 137/45 |
| 3,927,689 | * 12/1975 | Sharp et al. | 137/45 |
| 4,103,697 | * 8/1978 | Kiesow | 137/45 |
| 4,116,209 | * 9/1978 | Greer | 137/38 |
| 4,131,124 | 12/1978 | Sunde . | |
| 4,314,120 | * 2/1982 | Sharp et al. | 200/61.45 |
| 4,331,171 | 5/1982 | Novi . | |
| 4,336,818 | 6/1982 | Dauvergne . | |
| 4,429,704 | * 2/1984 | Jones | 137/45 |
| 4,485,832 | 12/1984 | Plemmons et al. . | |
| 4,503,717 | * 3/1985 | Keller et al. | 74/2 |
| 4,513,629 | * 4/1985 | Keller et al. | 74/2 |
| 4,513,763 | * 4/1985 | Ware | 137/38 |
| 4,535,796 | * 8/1985 | Terrones et al. | 137/45 |
| 4,542,760 | * 9/1985 | Flauiani | 137/45 |
| 4,565,208 | 1/1986 | Ritchie et al. . | |
| 4,742,839 | * 5/1988 | Stock | 137/38 |
| 4,745,939 | * 5/1988 | Greer et al. | 137/38 |
| 4,799,505 | 1/1989 | Nowell . | |
| 4,821,759 | * 4/1989 | Diamond | 137/45 |
| 4,911,029 | 3/1990 | Banba et al. . | |
| 4,915,122 | * 4/1990 | Ikegaya et al. | 137/38 |
| 5,143,110 | * 9/1992 | Simpson | 137/38 |
| 5,209,252 | 5/1993 | Perle . | |
| 5,240,025 | 8/1993 | Morris . | |
| 5,449,015 | * 9/1995 | Petkovic | 137/38 |
| 5,454,393 | 10/1995 | Crain . | |
| 5,482,074 | * 1/1996 | Hansen | 137/45 |

* cited by examiner

*Primary Examiner*—A. Michael Chambers
*Assistant Examiner*—Thomas L. McShane

(57) ABSTRACT

A movement detector and fluid shut-off device, including a housing having an ingress and egress for fluid flow. The device including a valve shut-off means for selectively blocking fluid flow. The valve shut-off means includes a plunger normally urged towards the egress. The plunger has a front end which is capable of sealing the egress. The device also includes a detector means for detecting movement. The detector means includes a free weight hung on internal structure of the housing defining support structure. The detector means further includes release means which holds the plunger in a first position away from the egress allowing fluid flow and releases the plunger to its second, activated, position upon sufficient oscillation of the free weight.

17 Claims, 2 Drawing Sheets

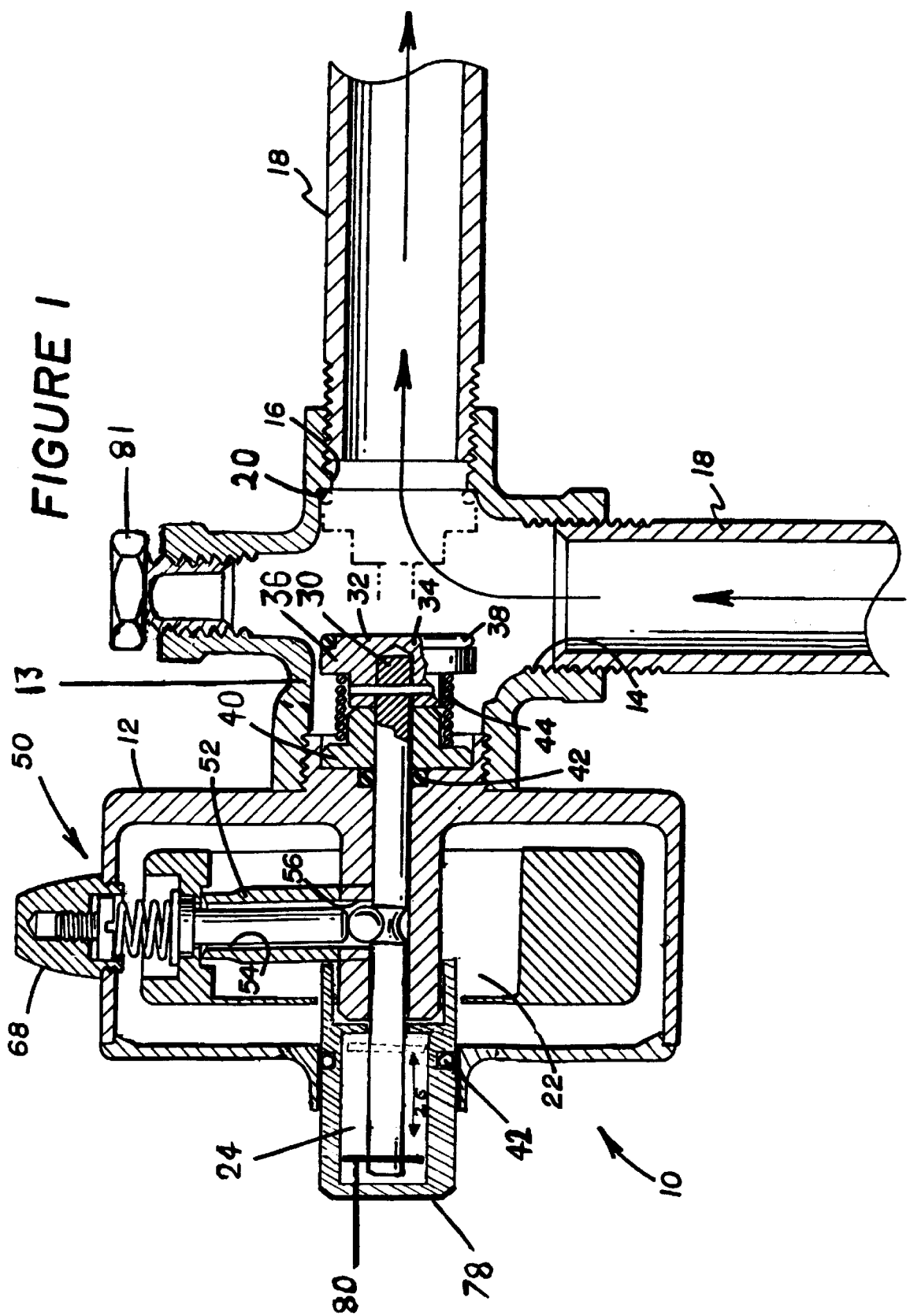

MOVEMENT DETECTOR AND FLUID SHUT-OFF DEVICE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention relates generally to movement detectors and more particular for movement detectors which include devices to shut off fluid flow.

The danger from earthquakes is well known. The ground trembles causing shock waves and movement to be sent from the point of the earthquake. This movement can be extremely severe. The force of a large earthquake can cause catastrophic damage. Buildings may be toppled, roads may buckle and bridges may collapse. Although earthquakes are better known for occurring in the western United States, some of the most severe earthquakes have occurred in the mid-west and even in the northeast.

While the earthquake itself may cause severe damage, the number of lives that can be lost as a result of fire and explosion is far greater. For example, if a resident has natural gas utility, a pipeline enters the home from a main pipeline from the utility company. In the event of an earthquake the regulator at the incoming pipeline may break and cause natural gas to be spewed into the air and generally in the vicinity of the house. If the gas is ignited an explosion can occur causing severe damage and catastrophic injury.

Thus, it is essential to keep the natural gas confined in the pipeline in order to minimize personal injury and property damage. Devices designed to keep natural gas confined to the pipeline had long been available to the general public. However, these devices have been seldom used by the public because they are generally unreliable. The devices are difficult to set so that they go off at the proper time. For example, Sharp, et al., U.S. Pat. No. 3,927,689, discloses an earthquake response safety valve assembly which relies upon pressure from the weight of a ball on a pin. Hansen, U.S. Pat. No. 5,482,074, discloses a safety cut-off device that utilizes a pendulum trigger assembly to keep a spool member in the open position. Simpson, U.S. Pat. No. 5,143,110, discloses a seismic gas shut-off valve in which a piston is suspended by seven steel balls that rest on the angled floor of an upper chamber and extend partially into the groove so that the ridge rests on the balls. Terrones, U.S. Pat. No. 4,535,796, discloses a seismic actuated shut-off valve that utilizes a severable link. These types of devices go off either too easily or not until extreme movement is reached, in which case the catastrophe may have already occurred without the device ever going off. Thus, in the event of an earthquake, which is not catastrophic in nature but which is significant to break a regulator, the devices may fail to go off. Additionally, if the earthquake is so slight that a regulator or pipeline would not be broken, then such devices may go off causing the homeowner to find the devices unreliable. The homeowner would at the very least need to reset the device. However, because of the inconvenience of resetting the device, the homeowner might adjust the setting so that the device is activated only in the event of a catastrophic earthquake.

Additionally, it has been recognized that being able to reset the device is important. Sharp, et al., in U.S. Pat. No. 4,314,120 restructured their device so that it was resettable. Others have also attempted to make the resettable device. For example, in Kiesow, U.S. Pat. No. 4,103,697, a resettable structure is disclosed which incorporates a square groove with a pin needing a precise tolerance in order to work with an alignment means. The length of the shut off plunger must be precise because if it is too short the gas will flow and if it is too long the pin will not align with a square groove on the plunger. This device is expensive to manufacture as a result. Additionally, the square grove may make it difficult for the Kiesow device to activate the plunger and shut off the gas. Another example of an attempt to make a resettable earthquake activated shut off valve is found in Hansen, U.S. Pat. No. 2,054,563. However, in order to reset this device, the gas line must be turned off and then the device can be reset. Furthermore, Greer, U.S. Pat. No. 4,116,209 discloses a shock actuated valve that has a tapered cylindrical valve gate suspended on an actuator pin. To reset the valve, the user must remove the closure from the stowage arm and engaging the retrieval loop in the valve head with a suitably bent wire. Greer, U.S. Pat. No. 4,745,939, is an improvement of Greer's earlier invention. This device has two valves aligned so that the actuator pins are at a 45-degree angle to one another. Each valve has a tether for resetting the valve by lifting the gate back onto the pin. Once activated, these devices are not easily reset.

The above background reveals what is and has been needed for a long time: a movement detector and a shut-off device that can be properly set to go off only if there is a danger of the gas line breaking causing leakage and which is easily adjustable and resettable.

BRIEF SUMMARY OF THE INVENTION

It is a generally object of this invention to provide a movement detector and shut-off device which will upon sufficient movement cause the free flow of fluid to stop.

It is a further object of this invention to provide such a device which is easily adjustable and resettable.

It is a still further object of this invention to provide a movement detector and shut-off device which is reliable.

The movement detector and shut-off device which accomplishes the objects as set forth above and as will be appreciated more fully herein, comprises;

a housing having an ingress and egress for fluid flow; a valve shut off means for blocking fluid flow, including a plunger having a first end for sealing the ingress, the plunger having a first position away from the egress and a second position sealing the egress and tensioning means urging the plunger toward the egress; and detector means for detecting movement including a free weight which oscillates in response to movement, the housing having internal structure for supporting the free weight and release means for holding the plunger away from the egress and for releasing the plunger upon oscillation of the free weight, whereby upon movement, the free weight oscillates causing the release means to release the plunger and seal the egress thereby blocking fluid flow.

In preferred embodiment of the invention, the plunger includes a semicircular detent and the detector means includes a rod approximately at right angles and a spherical ball between the rod and with the ball at least partially within the detent. Upon movement, the free weight oscillates releasing the ball from the detent and allowing the plunger to be activated and shut off the free flow of gas.

In a preferred embodiment, the egress is generally perpendicular to the ingress.

In a further preferred embodiment, a tensioning means urges the rod against the ball in the detent. The tensioning means is adjustable.

In a further preferred embodiment, the plunger is resettable and the rod is adjustable.

It is advantage of the movement detector and shut-off device in accordance with this invention to be easily resettable and adjustable.

It is a further advantage of the motion detector and shut-off device in accordance with this invention to be economical and simple to use.

These and other objects and advantages of the invention will be appreciated more fully hereinafter with reference to the drawing and the detailed description of the invention.

BRIEF SUMMARY OF THE SEVERAL VIEWS OF THE DRAWING

FIG. 1 is an elevated cross sectional plan view of the movement detector and shut-off device in accordance with this invention.

DETAILED DESCRIPTION OF THE INVENTION

Figure 2:
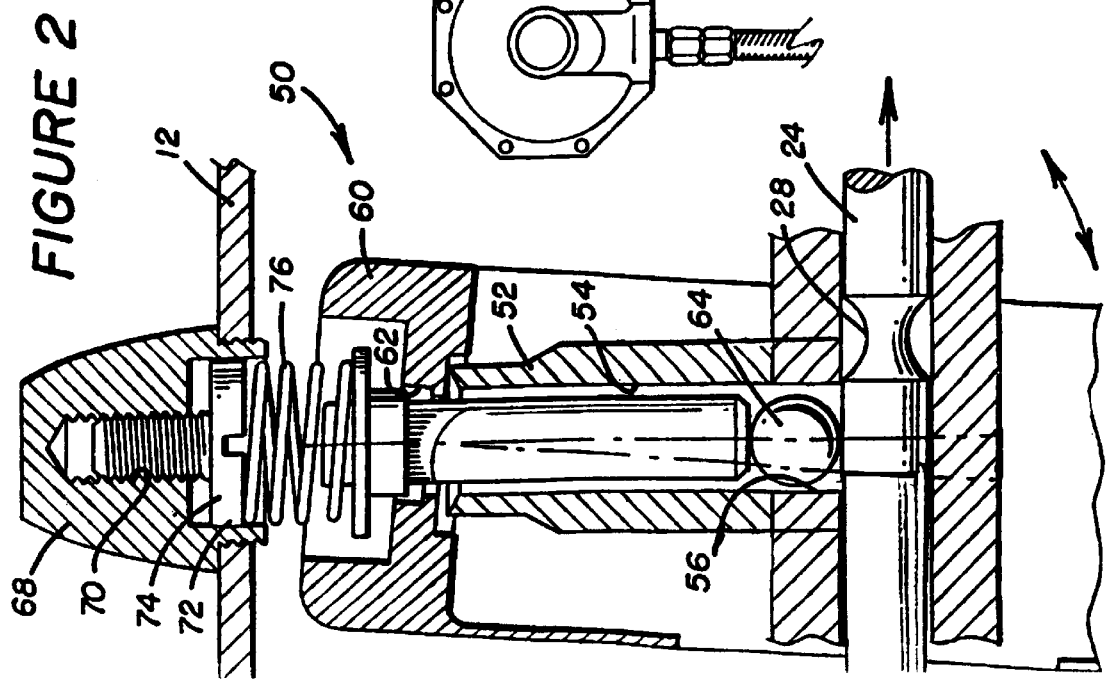
FIG. 2 is an enlarged sectional view of the device shown in FIG. 1.

With particular reference to FIGS. 1 and 2, there is shown the invention, a movement detector and fluid shut-off device, shown generally by the numeral 10. The device includes a housing 12. The housing includes a front boss 13 having an ingress 14 and an egress 16. The front boss 13 is threadably mounted on housing 12. The ingress 14 and egress 16 include female threaded portions for compatibly mating with the fluid pipeline 18. The ingress 14 and egress 16 are at approximately right angles to one another which facilitates the working of the shut-off device as will be explained more fully below. The egress 16 further includes sealing structure 20 on the surface of the egress 16 away from the outgoing pipeline 18.

The device 10 in accordance with this invention further includes a valve shut-off shown generally by the numeral 22. The valve shut-off includes a plunger 24 which slides back and forth in an opening 26 in housing 12. The plunger 24 has a detent 28. The detent 28 is semicircular and may alternately be semi-elliptical.

The plunger 24 has a front end zone 30 having an enlarged distal portion 32. The distal portion 32 has an outer surface 34 with a circular recess 36. The recess is sized and shaped to hold a sealing structure, an O-ring 38. The front end zone 30 has an enlarged proximal portion 40 attached to the housing 12.

The opening 26 is sealed against fluid entrance by the connection of the proximal portion 40 to the housing 12 and the placement of O-ring 42 between proximal end 40 and the housing 12.

A spring 44 normally urges the distal portion 32 toward the egress 16. The spring 44 provides a force sufficient to force O-ring 38 and sealing structure 20 together such that they seal fluid from entering exiting pipeline 19, thereby sealing the egress 16.

The device 10 in accordance with this invention further includes a movement detector shown generally by the numeral 50. The movement detector 50 includes a support structure 52 attached to the housing 12 adjacent to the housing opening 26. The support structure 52 has an opening 54 which is aligned with a second opening in the housing 56. The second housing opening 56 is generally perpendicular to the first housing opening 26. The support structure 52 is mounted on the housing 12 by a screw 58 which allows for adjustment and alignment of openings 26 and 56.

A free weight 60 is hung on the support structure 52 as best shown in FIG. 2. The free weight has an opening 62 which aligns with the support structure opening 54. The free weight 60 is cylindrical and responds to movement by oscillating back and forth as shown by the arrows in FIG. 2.

A ball 64 slides within the openings 54 and 56. The ball is sized and shaped such that at least a portion of it is within the detent 28. Depending on the application, it may be preferable to have a semi-elliptical detent rather than the semicircular one shown in FIGS. 1 and 2.

A rod 66 is sized and shaped to slide compatibly through the free weight opening 62 and in support structure opening 52. A cap 68 is threadably secured by exterior thread to the housing 12. The cap 68 includes internal threads 70. A set screw 72 has threads 74 which engage internal threads 70 of the cap 68. The set screw 72 includes an enlarged end adjacent to the rod 66. A spring 76 between enlarged end 74 and rod 66 urges the rod toward the plunger 24.

The tension on the spring may be increased or decreased by adjusting the set screw 72. To increase the tension, the set screw 72 is loosened against the cap threads 70 extending the enlarged end 74 of the set screw 72 toward the rod 66. The spring 76 compresses further thereby exerting tension. This further tension has the effect of making it more difficult for ball 64 to be released from the detent 28. Thereby, more movement is required by the free weight 60 to cause plunger 24 to be released and seal egress 16.

In Use

Figure 3:
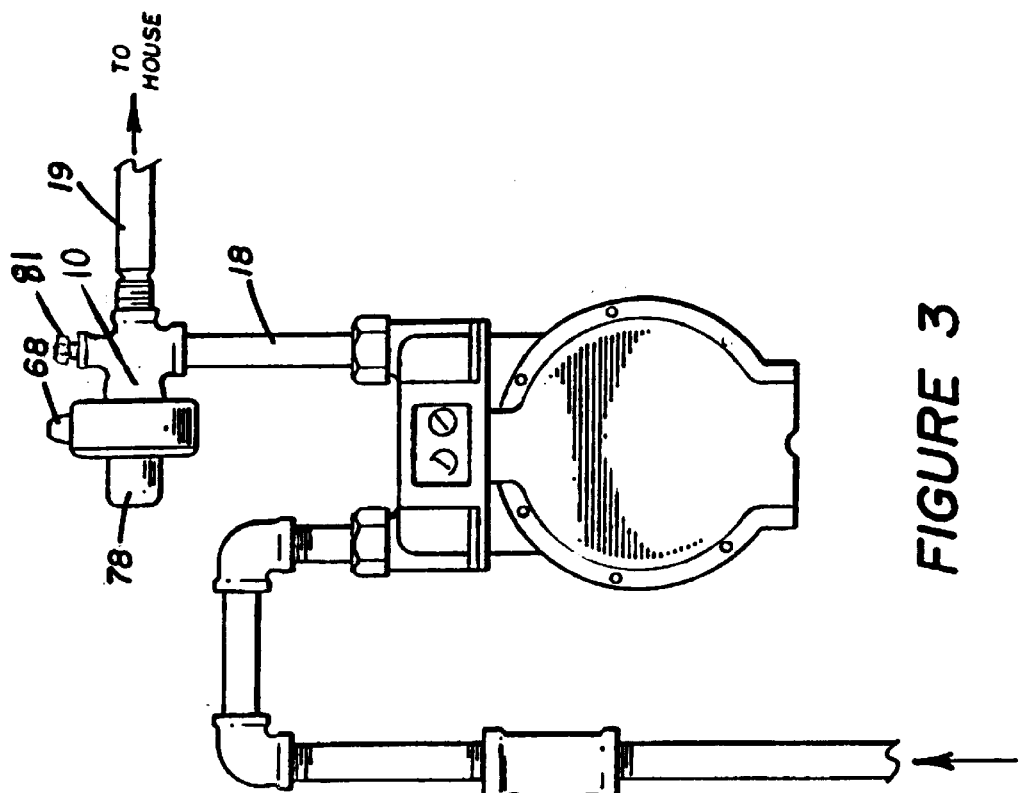
FIG. 3 is an illustration of the movement detector and gas shut-off device in accordance with this invention in use.

The device 10 is attached to the gas pipeline of the residence of a user as shown in FIG. 3. The plunger 24 is pulled into a first position, whereby the detent 28 aligns with the second housing opening 56 as shown in FIG. 1. In the first position the ball 64 rests within the detent 28, thus locking the plunger 24 in place and preventing movement toward the egress 16. Thus, spring 44 is held in compression urging distal portion 32 toward egress 16.

Spring 76 exerts force on rod 66 to hold the ball 64 in the detent 28. As described earlier, the set screw 72 may be extended to cause the spring 76 to exert a greater force against rod 66 thereby making it more difficult for ball 64 to be dislodged from the detent 28.

As movement occurs, free weight 60 begins to oscillate as best shown in FIG. 2. When the oscillations are severe enough, the inner portion of the free weight 60 adjacent opening 62 exerts an upward pressure on the rod sufficient to cause the rod to move upwardly and thus release ball 64 from the detent 28.

Once the compression force of the spring has been overcome sufficiently to release the ball 64 from the detent 28, the plunger 24 is released and slides until the distal portion 32 mating with the sealing structure 20 of egress 16, the plunger's second position. The spring 44 exerts sufficient pressure to cause O-ring 38 and sealing structure 20 to seal the exit of fluid through the exiting pipeline 19.

After the exiting pipeline 19 has been sealed by the release of the plunger 24, the fluid entering ingress 14 remains trapped in the interior of the front boss 13. As described earlier, the opening 26 in housing 12 is sealed by the proximal end 40 of plunger front end 30 and O-ring 42.

EXAMPLE

If an earthquake occurs having sufficient force to cause damage, it will create enough movement of the free weight to seal the egress. The valve shut-off 22 would be activated and prevent fluid from entering a home through pipeline 18. This is critical to those home users of natural gas.

After the danger from natural gas leakage is over, the device 10 is reset. In order to reset the device, cap 78 which fits over plunger 24 is pulled back to its first position and the detent 28 is aligned with the second housing opening 56 such that at least a portion of ball 64 fits within the detent 28 locking the plunger 24 in the first position.

While the instant invention has been described by reference to what is believed to be the most practical embodiments and particularly with it's usefulness as an earthquake safety device, it is understood that the invention may embody other specific forms not departing from the spirit of the general characteristics of the invention. It should be understood that there are other embodiments which possess the qualities and characteristics which would generally function in the same manner and should be considered within the scope of this invention. The present invention therefore should be considered in all respects as illustrative and not restricted, the scope of the invention being limited solely to attended claims rather than the foregoing description and all equivalents thereto being intended to be embraced therein.

What I claim as my invention is:

1. A movement detector and fluid shut-off device, comprising:
   a housing having an ingress and egress fluid flow;
   a valve shut-off means for blocking fluid flow, including a plunger having a detent and a first end for sealing the ingress, the plunger having a first position away from the egress and a second position sealing the egress and tensioning means urging the plunger toward the egress; and
   a detector means for detecting movement including a free weight which oscillates in response to movement, the housing having an internal structure for supporting the free weight and a release means for holding the plunger away from the egress and for
   releasing the plunger upon oscillation of the free weight; the release means being adjustable,
   whereby upon movement, the free weight oscillates causing the release means to release the plunger and seal the egress, thereby blocking fluid flow.

2. A device as set forth in claim 1, wherein the detent is semicircular and the release means comprises a rod normally urged for the plunger and a ball located between the rod and the plunger, the ball is sized and shaped for compatible fit with the detent.

3. A device as set forth in claim 2, wherein the rod and the plunger are generally perpendicular to one another.

4. A device as set forth in claim 2, wherein the free weight is generally cylindrical.

5. A device as set forth in claim 1, wherein the plunger is resettable.

6. A device as set forth in claim 1, wherein the egress is generally perpendicular to the ingress.

7. A device as set forth in claim 1, wherein the detent is semi-elliptical.

8. A device as set forth in claim 1, wherein the plunger includes a front end zone have sealing means.

9. A movement detector and fluid shut-off device, comprising:
   a housing having a front boss for mating with the pipeline, the front boss having an ingress and an egress for fluid flow;
   valve shut-off means for blocking fluid flow including;
      a plunger having a front end for sealing the egress, the plunger having a detent; and
      tensioning means normally urging the plunger towards the egress; and
   detector means for detecting movement, including;
      a free weight for responding to movement by oscillating, the housing having internal structure for supporting the free weight, and
      release means for holding the plunger away from the egress and for releasing the plunger upon oscillation of the free weight, the release means including;
      a rod, and
      tensioning means for urging the rod upward toward the plunger, a ball size tube compatibly nest in the detent, the ball being held in the detent by the force exerted by the rod,
   whereby upon movement, the free weight oscillates causing the release means to release the plunger and seal the egress, thereby blocking fluid flow.

10. A device as set forth in claim 9, wherein the detent is semi-circular.

11. A device as set forth in claim 9, wherein the detent is semi-elliptical.

12. A device as set forth in claim 9, wherein the plunger is resettable.

13. A device as set forth in claim 9, wherein the rod is generally perpendicular to the plunger.

14. A device as set forth in claim 9, wherein the rod slides within the support structure and the plunger slides within an opening in the housing.

15. A device as set forth in claim 9, wherein the free weight is supported by the support structure at the end further away from the plunger.

16. A device as set forth in claim 9, the free weight is cylindrical and the rod slides through an opening in the free weight.

17. A device as set forth in claim 9, wherein the egress in generally perpendicular to the ingress.

* * * * *